United States Patent
Walker

(10) Patent No.: US 6,743,131 B1
(45) Date of Patent: Jun. 1, 2004

(54) SINGLE STRAP FLOATING BELT TENSIONER

(75) Inventor: Howard F. Walker, Toppenish, WA (US)

(73) Assignee: Moxee Innovations Corporation, Moxee, WA (US)

( * ) Notice: Subject to any disclaimer, the term of this patent is extended or adjusted under 35 U.S.C. 154(b) by 0 days.

(21) Appl. No.: 09/685,427

(22) Filed: Oct. 10, 2000

(51) Int. Cl.⁷ .................................................. F16H 7/12
(52) U.S. Cl. ....................................... 474/134; 474/101
(58) Field of Search ................................ 474/134, 101, 474/138, 88, 109, 117, 114, 133, 135, 136, 150, 164, 116, 118; 280/284; 180/227

(56) References Cited

U.S. PATENT DOCUMENTS

| | | | |
|---|---|---|---|
| 68,625 A | | 9/1867 | Hawley |
| 171,354 A | * | 12/1875 | Cooley .......................... 474/134 |
| 1,338,405 A | | 4/1920 | Stickney |
| 1,499,920 A | | 7/1924 | Godden |
| 2,753,812 A | * | 7/1956 | Wharton ....................... 474/134 |
| 2,897,683 A | | 8/1959 | Carver |
| 3,313,168 A | | 4/1967 | Matthews |
| 3,575,058 A | | 4/1971 | Kraus |
| 3,630,096 A | | 12/1971 | Brewer |
| 3,646,784 A | | 3/1972 | Zarrello |
| 3,926,063 A | | 12/1975 | Mayfield |
| 3,941,006 A | | 3/1976 | Brodesser |
| 4,034,821 A | * | 7/1977 | Stoddard et al. ............. 474/134 |
| 4,068,535 A | | 1/1978 | Sheets |
| 4,141,245 A | * | 2/1979 | Brandstetter ................ 474/109 |
| 4,420,359 A | | 12/1983 | Goldsworthy |
| 4,479,660 A | | 10/1984 | Pattison |
| 4,564,098 A | * | 1/1986 | Hormann ................ 474/134 X |
| 4,662,862 A | | 5/1987 | Matson |
| 4,798,562 A | | 1/1989 | Matson et al. |
| 4,850,934 A | | 7/1989 | Gibson, Jr, et al. |
| 4,892,508 A | | 1/1990 | Ryan et al. |
| 5,000,724 A | | 3/1991 | Reid |
| 5,167,159 A | * | 12/1992 | Lucking ................. 73/862.451 |
| 5,221,236 A | | 6/1993 | Raymer et al. |
| 5,457,967 A | | 10/1995 | Scherzinger |
| 5,725,450 A | * | 3/1998 | Huskey ....................... 474/134 |
| 5,776,025 A | * | 7/1998 | Labudde et al. ............ 474/134 |
| 6,117,034 A | * | 9/2000 | Vine ........................... 474/134 |
| 6,179,740 B1 | * | 1/2001 | Walker ........................ 474/134 |

FOREIGN PATENT DOCUMENTS

| | | |
|---|---|---|
| GB | 2 092 705 | 8/1982 |
| JP | 58-178042 A | * 10/1983 |

* cited by examiner

*Primary Examiner*—Marcus Charles
(74) *Attorney, Agent, or Firm*—Christensen O'Connor Johnson Kindness PLLC

(57) ABSTRACT

A tensioning device for a drive system having a flexible drive element mounted on at least one driven member, the tensioning device including a first tensioning member having a first side, a second side, and a first contact surface for contacting the drive element and a second tensioning member having a first side, a second side, and a second contact surface for contacting the drive element. The tensioning members are secured to the first and second ends of an elongated connecting member, positioning the members in a spaced relationship to one another so that the contact surfaces of the tensioning members are in opposing disposition facing one another. The tensioning members are spaced apart so as to permit the first and second runs of the drive element to pass between the tensioning member contact surfaces. The connecting member holds the tensioning members a fixed distance from one another during operation of the drive system, such that when the tensioning device is in contact only with the drive element, the tensioning device can respond to fluctuations in load on the drive element by moving in a direction parallel to the drive element at the points of contact between the drive element and the tensioning members. The second sides of the tensioning members remain unconnected to provide free access to the drive element therebetween. The connecting member defines at least one longitudinal contour along the length of the connecting member that reinforces the stiffness of the member.

10 Claims, 2 Drawing Sheets

SINGLE STRAP FLOATING BELT TENSIONER

FIELD OF THE INVENTION

The present invention relates to tensioning devices for drive systems and specifically to drive systems utilizing flexible drive elements such as belts and chains.

BACKGROUND OF THE INVENTION

The present invention is adapted for use with a conventional drive system in which a driven member and drive member, such as pulleys or sprockets, are connected by a flexible drive element such as a belt or chain. Typically, the driven member is coupled to a motor directly or indirectly through a reduction gear system and the drive member is attached to an input drive shaft protruding from a piece of machinery. In such an arrangement, it is well know that the proper functioning of the drive system and the operating life of the drive system and flexible drive element can be significantly enhanced by maintaining the two flexible drive element runs between the drive and driven members in tension such that significant slack does not occur in either run. One method of providing such tension is to resiliently bias the drive and driven members away from one another. However, a more common and typically more convenient arrangement is to provide a tensioning device that biases one or both flexible drive element runs inward towards the other run at a point intermediate of the drive and driven members. A number of examples of this latter type of tensioning device are disclosed in the prior art. However, in the great majority of prior tensioning devices, the tensioning device is adapted to operate in a particular drive system and can not be used as a universal tensioning device capable of application in drive systems containing a wide range of combinations of flexible drive elements and drive and driven members.

One result of the fact that prior tensioning devices have been adapted for specific applications is that in many cases, prior tensioning devices have been mounted or secured to a support that is fixed with respect to the drive and driven members. Through use of such a support arrangement, the position of the tensioning device between the drive and driven members can be controlled, to maintain the tensioning at the optimum position.

A further feature of many prior art tensioning devices is that in such devices, the surfaces contacting the two runs of the drive element and urging them inward have either been fixed in position with respect to one another, or resiliently biased towards one another by springs or similar means. A disadvantage of the resilient biasing technique is that it adds complexity to the tensioning device, and the resiliently biased elements are subject to increased wear over time. Tensioning devices having fixed distances between their contact surfaces cannot be adjusted as the flexible drive element experiences wear. Thus, the tensioning force provided by the device decreases over time. A further disadvantage of a fixed distance between contact surfaces is that the tensioning device cannot be used with different sized drive and driven members or flexible drive elements.

Another disadvantage of prior art devices is that the tensioning device completely encircles the flexible drive element. For example, the flexible drive element is encircled by tensioning members such as rollers or sprockets on the top and bottom, and on each side by connecting members, such as straps, which couple the tensioning members a fixed distance apart. Inasmuch as the tensioning device completely encircles the upper and lower runs of the flexible drive element, the tensioning device can not be removed from the flexible drive element without disassembling the tensioning device, such as by removing a strap from one side of the tensioning device, or by removing the flexible drive element from at least one of the drive or driven members and sliding the tensioning device off that "end" of the flexible drive member. Therefore, significant amounts of labor are required to perform maintenance on the tensioning device and drive system.

SUMMARY OF THE INVENTION

In accordance with the present invention, a tensioning device for a drive system having a flexible drive element, such as a belt or chain, mounted on at least one driven member is provided. The tensioning device includes a first tensioning member, a second tensioning member, and a connecting member. The tensioning members each have a first side, a second side, and a contact surface for contacting the drive element. The connecting member has a length, a first end and a second end, whereby the first sides of the tensioning members are secured to the respective ends of the connecting member in a spaced relationship to one another. The second sides of the tensioning members remain unconnected to the connecting member to allow for free access to the drive element. The connecting member has at least one longitudinal contour along the length of the connecting member that reinforces the stiffness of the member. The first and second contact surfaces of the tensioning members are facing one another and are spaced apart by a distance sufficient to permit first and second runs of the drive element to pass between the tensioning members while in contact with the first and second contact surfaces, respectively. The connecting member holds the tensioning members a fixed distance from one another during operation of the drive system, such that when the tensioning device is in contact only with the drive element, the tensioning device can respond to fluctuations in load on the drive element by moving in a direction parallel to the drive element at the points of contact between the drive element and the tensioning members.

In accordance with other aspects of this invention, the longitudinal contour is formed by having at least one edge formed along the length of the connecting member, angled relative to the first side. In accordance with one aspect of the present invention, the longitudinal contour comprises a rib formed along the length of the connecting member. In accordance with still yet other aspects of the present invention, the first tensioning member is mounted on the connecting member so that it can be selectively positioned at a selected distance from the second tensioning member. This selective adjustability is provided in a preferred embodiment by a connecting member with a plurality of apertures for selectively mounting the tensioning member at a selected distance from the second tensioning member.

In accordance with additional aspects of the present invention, the connecting member is connected to the first and second sides of at least one of the tensioning members wherein the side of the tensioning device containing the said second sides of the tensioning members remains unobstructed for free access to the drive element. In accordance with further additional aspects of the present invention, the tensioning members are formed as rollers or sprockets.

A tensioning device formed in accordance with the present invention has several advantages over currently available tensioning devices. The orientation of the connecting member on only one side of the tensioning members allows the user to access the flexible drive element without disassembling the device, such as by removing a strap from one side of the tensioning device, or by removing the flexible drive element from at least one of the drive or driven members and sliding the tensioning device off that "end" of the flexible drive element. Therefore, significant amounts of labor are saved during the performance of maintenance on the tensioning device and drive system. In addition to being easier to maintain, the device is simpler and less costly to manufacturer. Inasmuch as a tensioning device formed in accordance with the present invention includes a single connecting member, raw material, manufacture, and assembly labor costs are all reduced compared to currently available tensioning devices utilizing two or more connecting members.

Further, the invention is advantageous since the tensioning device is able to operate with a single connecting member without having the flexible drive element disengage from the tensioning device. This is accomplished by having a longitudinal contour along the length of the connecting member that reinforces the stiffness of the member. A stiff connecting member resists any forces that may subvert the parallel alignment of the tensioning member contact surfaces, greatly enhancing the ability of the flexible member to remain engaged with the tensioning device. Thus a tensioning device formed in accordance with the present invention is economical to produce, easier to maintain, and effective.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
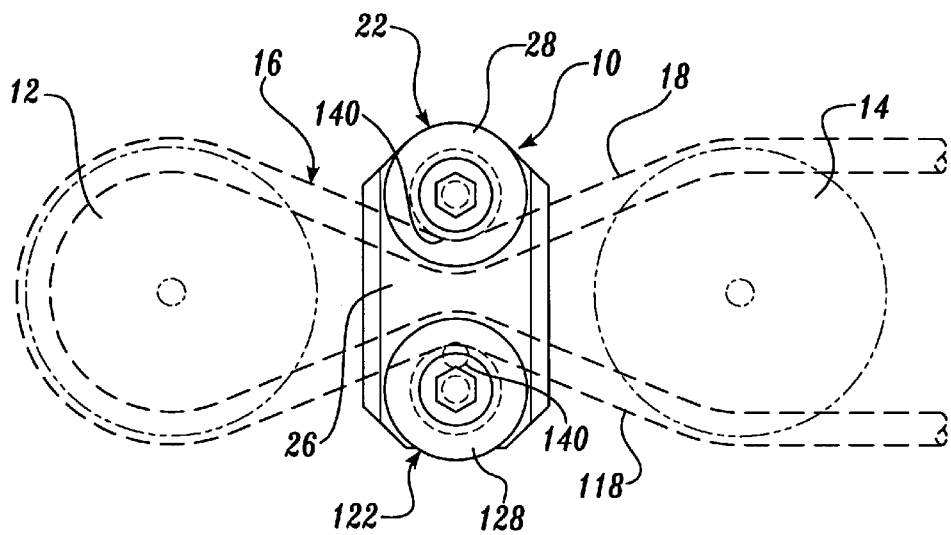
FIG. 1 is a side elevation of one embodiment of the tensioning device of the present invention used in connection with a belt.

FIG. 1 illustrates a tensioning device 10 of the present invention used in connection with a conventional drive system that includes drive and driven members 12 and 14 interconnected by a flexible drive element 16. An upper run 18 of the flexible drive element 16 extends between the upper halves of the drive and driven members 12 and 14, and lower run 118 extends between the lower halves of the drive and driven members 12 and 14. Depending upon which of the drive and driven members 12 or 14 is driven, and depending upon the direction of rotation of the driven member 12 or 14, either upper run 18 or lower run 118 will be placed under tension by the driving mechanism. However, in the absence of the tensioning device of the present invention, the other run will be slack, thereby increasing wear of the flexible drive element 16 and ultimately leading to the possibility that the flexible drive element 16 will come off one of the drive or driven members 12 and 14.

In the preferred embodiment illustrated, the drive and driven members 12 and 14 are pulleys, and the drive element 16 is a belt. However, the present invention can be adapted for use on a chain drive element mounted on sprockets as well, as noted further below.

Tensioning device 10 includes an upper tensioning member 22 and a lower tensioning member 122 interconnected by an elongated connecting member 26. Upper tensioning member 22 includes an upper roller 28 that engages upper run 18 at the upper contact surface 40, and lower tensioning member 122 includes a lower roller 128 that engages lower run 118 at the lower contact surface 140. The upper tensioning member 22 and lower tensioning member 122 are mounted to the ends of connecting member 26. During operation of the tensioning device 10, connecting member 26 holds the upper and lower tensioning members in fixed position with respect to one another, despite the forces exerted by the tension in the flexible drive element 16 tending to move the upper tensioning member 22 apart from the lower tensioning member 122. However, the tensioning device of the present invention can readily be adjusted to decrease the separation between the tensioning members 22 and 122 to take up slack caused by elongation of the flexible drive element during its lifetime or wear of mechanical parts in the drive system. The separation distance can also be adjusted to accommodate various sizes of drive and driven members 12 and 14 or flexible drive elements 16.

Figure 2:
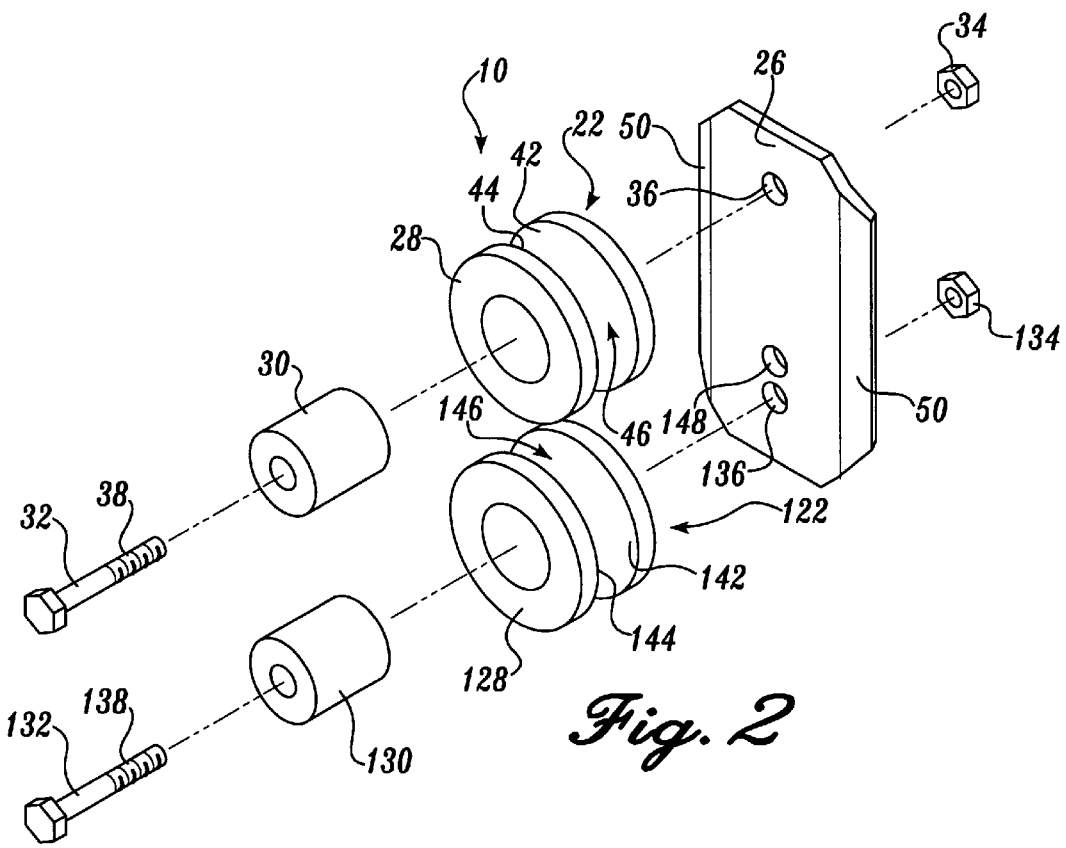
FIG. 2 is an exploded perspective view of the tensioning device of FIG. 1.
Figure 3:
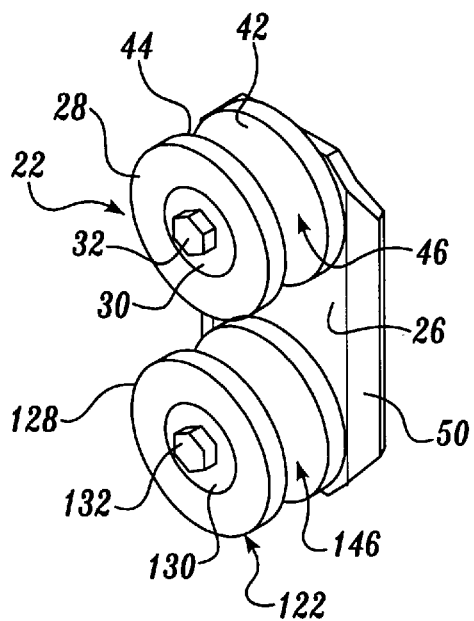
FIG. 3 is a perspective view of the tensioning device of FIG. 1.

Referring now to FIG. 2, upper tensioning member 22 includes the upper roller 28, an upper bushing 30, an axle bolt 32 with a threaded end 38, and an axle bolt fastener 34. The lower tensioning member is similarly arranged, including the lower roller 128, a lower bushing 130, an axle bolt 132 with a threaded end 138, and an axle bolt fastener 134. In the preferred embodiment illustrated in FIGS. 1–4, the elements of the upper and lower tensioning members are identical to one another, and a numbering scheme is used in which elements of the lower tensioning member are assigned reference numerals 100 greater than the reference numerals of the corresponding elements of the upper tensioning member. Where the context permits, reference in the following description to an element of one of the tensioning members 22 and 122 shall be understood as also referring to the corresponding element in the other tensioning members.

Figure 4:
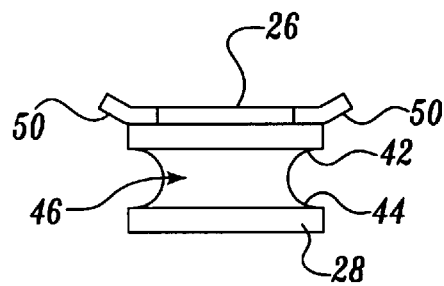
FIG. 4 is an end elevation view of the tensioning device of FIG. 1.

As best seen in FIG. 4, roller 28 includes an annular U-shaped channel 46 defined about its perimeter by identical curved sidewalls 42 and 44 contoured to generally coincide with the shape of the contact surface of the flexible drive member 16 (not shown). Referring now to FIG. 2, the upper run 18 of the flexible drive element 16 (not shown) rides in channel 46. Sidewalls 42 and 44 keep the flexible drive element centered in the U-shaped channel 46 as well as form the contact surface between the flexible drive element 16 (not shown) and the roller 28.

Referring to FIG. 1, when the tensioning members 22 and 122 are spaced an appropriate distance from one anther, the tensioning device 10 maintains a fixed average position between the drive and driven members 12 and 14 during operation of the drive system, without the use of any auxiliary structure to position the tensioning device with respect to the drive and driven members 12 and 14. It is in a free floating relationship with regard to the drive and driven members 12 and 14. The best separation of the tension members 22 and 122 may readily be determined by initially setting the tensioning members 22 and 122 a comparatively large distance apart, and then operating the drive system. If the separation distance does not adequately tension the flexible drive element 16 during operation, then the separation distance of the contact surfaces 40 and 140 of the rollers 28 and 128, respectively, is decreased until the optimum position is found.

Referring to FIG. 2, the separation distance is adjusted by selectively mounting the lower tensioning member 122 at a plurality of vertically spaced locations along the length of connecting member 26. Connecting member 26 contains an aperture 36 at the first end of the connecting member 26, with a plurality of additional vertically spaced apertures 136 and 148 at the second end of the connecting member 26. The apertures 36, 136 and 148 in the connecting member 26 are vertically spaced and dimensioned to accept the axle bolts 32 and 132. By selecting a specific aperture from the array defined by the plurality of apertures 136 and 148 located on the second end of the connecting member 26 to mount the lower tensioning member 122, the user can readily adjust the tensioning device 10 of the present invention to decrease or increase the separation of the rollers 28 and 128, thereby adjusting correspondingly the tension of the flexible drive element 16 (not shown). The specific number of apertures provided may be varied as desired for more or less adjustability.

Still referring to FIG. 2, the user can increase tension in the flexible drive element by removing axle bolt fastener 134 from the axle bolt 132. The axle bolt 132 is then disengaged from the connecting member 26 by moving the axle bolt 132 along its longitudinally axis in a direction away from the connecting member 26 until the threaded end 138 of the axle bolt 132 is free of the lower aperture 136 in the connecting member 26. At this point, the flexible drive element is still contained within the U-shaped channels 46 and 146 of the rollers 28 and 128 respectively with the bushings 30 and 130 still in contact with the connecting member 26. The lower tensioning member 122 is forced upward relative to the upper tensioning member 22 until the threaded end 138 of the axle bolt 132 is indexed with the adjacent upper, vertically aligned aperture 148 in the connecting member 26. The axle bolt 132 is then inserted in aperture 148 in the connecting member 26 and an axle bolt fastener 134 is attached to the threaded end 138 of axle bolt 132, removably mounting the lower tensioning member 122 to the connecting member 26. To decrease the tension exerted upon the flexible drive element 16 (not shown), the user simply reverses the above process. In this manner, the position of the tensioning members 22 and 122 relative to one another can be adjusted to provide adequate operational tension on the flexible drive element 16.

Referring to FIG. 1, an important feature of the present invention is the presence of only a single connecting member 26. The use of a single connecting member 26 allows free access to the flexible drive element 16 on the side opposite the connecting member 26. This feature allows a user to insert or remove a flexible drive element 16 from the side of the tensioning device 10 without disassembling the tensioning device 10, resulting in the reduction of labor expended during maintenance activities.

While one side of the tensioning member 22 and 122 are connected by the single connecting member 26, the opposing side of the tensioning members 22 and 122 are independent and unobstructed. A space or gap is defined between the unconnected sides of the tensioning members, providing free and unobstructed access to the space between the rollers 28 and 128.

For example, with applications requiring only low to moderate tension in the flexible drive member 16, the upper run 18 of the flexible drive member 16 can be simply forced towards the lower run 118 with hand pressure while the tensioning device 10 is forced upward. Sufficient pressure is exerted downward on the upper run 18 of the flexible drive element 16 to disengage the upper run 18 from the contact surface 40 of the roller 28 and so that the upper run 18 can be lifted over the outboard sidewall 44 of the U-shaped channel 46, as best shown in FIG. 2. Once the upper roller 28 is disengaged from the upper run 18, the tensioning device 10 is lowered, disengaging the lower run 118 of the flexible drive element 16 (not shown) from the lower roller 128. Therefore, the tensioning device 10 can be removed from the flexible drive element 16 without disassembly of the tensioning device 10 or removing the flexible drive element 16 from one of the drive or driven members 12 and 14 and pulling the free "end" of the flexible drive element through the tensioning device 10. The tensioning device 10 can be reinstalled upon the flexible drive element 16 by following the same procedures in reverse.

In applications requiring high tension in the flexible drive element 16, it may be necessary to relieve tension in the flexible drive element 16 to remove the tensioning device 10. This is typically accomplished by decreasing the separation distance between the drive and driven members 12 and 14 by means well know in the art, thereby reducing the tension in the flexible drive element 16. The tension in the flexible drive element 16 is reduced to a level enabling the user to remove the tensioning device 10 in the same manner as described above for a low to moderate tension system. Therefore, even in applications requiring high tension, the tensioning device 10 can be removed from the flexible drive element without disassembling the tensioning device 10 or removing the belt from either of the drive or driven members 12 and 14. This also facilitates installation of the device 10 in closely confined areas, such as machinery cabinets.

A further important feature of the present invention is that it is capable of operation without any structure for positioning the tension device on runs 18 and 118 between the drive and driven members 12 and 14. This is true regardless of which of the drive and driven members 12 and 14 is the driven member and which is the drive member and regardless of the direction of rotation of the drive and driven members 12 and 14. The tensioning device 10 of the present invention therefore provides a device having a wide range of applications to different drive systems. It is to be understood that the present invention is also applicable to drive stems in which the flexible drive element is a chain, rope, bead chain, V-belt or other alternately configured belt, or any other flexible drive element. When the drive element is a chain, sprockets or slide members with stationary, low contact guide surfaces are used in place of rollers in the device of the preferred invention.

In a conventional tensioning arrangement, the upper and lower tensioning members or their equivalents are resiliently mounted to an external structure such that they can move in directions normal to the drive element, to accommodate the inevitable fluctuations in load or tension during operation of the drive system. By contrast, the tensioning device of the present invention is mounted in a free-floating manner on the flexible drive element. The tensioning members are secured a fixed distance from one another, but the tensioning device can move along the drive flexible element to accommodate fluctuations. This movement along the drive element provides a very effective vibration and shock absorber mechanism. In addition, unlike a conventional arrangement, shock and vibration are not transmitted through the tensioning device to an external structure.

A further important feature of the present invention is the shape of the connecting member 26. The connecting member 26 is formed to resist a bending moment when installed on a tensioned drive element. The flexible drive element 16 exerts an upward force upon the upper roller 28 and a downward force upon the lower roller 128, equal and opposite to the forces applied by the tensioning device 10 upon the flexible drive element 16. These forces are transmitted via the axle bolts 32 and 132 to the connecting member 26, exerting a bending load on the connecting member 26 along its length so that the surface of the connecting member 26 facing the rollers 28 and 128 is in tension and the opposing surface is in compression. To resist this bending moment, a longitudinal contour 50, one embodiment of which is illustrated in FIG. 4, is formed along the length of the connecting member 26 to reinforce the stiffness of the connecting member 26. A connecting member 26 unable to resist the bending moment will create a situation where the axle bolts 32 and 132 will no longer be parallel to each other, having been bent away from the flexible drive member 16, greatly increasing the chance that the flexible drive element 16 will walk out of the U-shaped channels 46 and 146 in the rollers 28 and 128.

The longitudinal contour 50 is formed, in the preferred embodiment, by bending first and second longitudinal edges of the connecting member 26 to place the bent edges at an angle relative to the surface of the connecting member. Although a wide range of relative angles are acceptable, in the preferred embodiment shown, a relative angle of 30° is used. The bent edges form longitudinal reinforcement flanges, which strengthen the connecting members with a minimum increase in weight. In this manner, even when only a single connecting member is employed and tensioned, the contact surface of the rollers are maintained in a parallel disposition. The connecting member may also be reinforced through other means such as, although not limited to, the attachment of structural members, such as ribs or I-shaped members.

Of importance, the above described preferred embodiment describes a connecting member 26 containing three apertures 36, 136, and 148 for illustrative purposes, however it should be evident to one skilled in the art that a plurality of apertures far exceeding three is possible. In addition, although the preferred embodiment is described with rollers 28 and 128 as elements of the tensioning members 22 and 122, it should also be evident to one skilled in the art that tensioning members may include sprockets, or blocks as disclosed in U.S. Pat. No. 4,798,562 to Matson et al., hereby incorporated by reference, and other well known devices. In addition, although two tensioning members 22 and 122 were shown for illustrative purposes, it is understood that the invention may also be practiced with three or more tensioning members.

In one alternative embodiment, the connecting member is manufactured so that a U-shaped structure is formed at each end of the connecting member. The tensioning member is inserted into the U-shaped structure and attached so that both the first and second sides of the tensioning member are attached to the connecting member. However, the side of the tensioning device containing the second sides of the tensioning members is absent of any structural member connecting the second sides of the tensioning members. Therefore, unobstructed free access is still available to the drive element.

Figure 5:
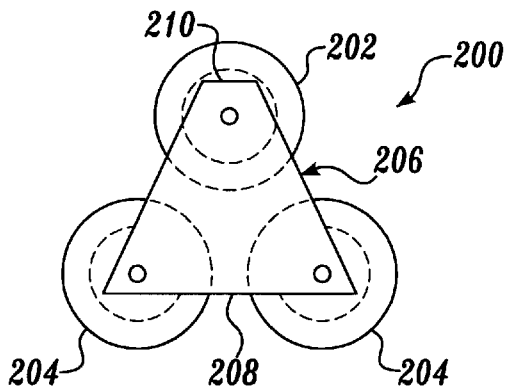
FIG. 5 is a side elevation of an alternate embodiment of the present invention using three tensioning members.

FIG. 5 illustrates yet another alternative embodiment of the present invention. Tensioning device 200 of FIG. 5 is constructed similarly to the previously described tensioning device 10. However, rather than two tensioning members 22 and 122, the tensioning device 200 of FIG. 5 includes three tensioning members, which in the illustrated embodiment are constructed in the form of rollers. Thus, the tensioning device 200 includes an upper roller 202 and two lower rollers 204. The two lower rollers 204 are spaced slightly apart, and the upper roller 202 is disposed above and midway between the axes of the two lower rollers 204. The upper and lower runs of a flexible drive element, e.g. a belt, are received between the upper and lower rollers, with the upper run being engaged in the groove of the upper roller 202 and the lower run being engaged in the grooves of the lower rollers 204.

The rollers 202 and 204 of the tensioning device 200 are mounted on a generally triangular shaped connecting member 206. Connecting member 206 has a narrow upper end 210 to which is journaled the upper roller 202, and a wider lower end 208, at the corners of which are journaled the two lower rollers 204. The connecting member 206 is illustrated as a triangle that is truncated at the upper end 210, but it should be understood that alternate shapes including a t-shape could instead be employed. A first side of each roller 202, 204 is disposed adjacent to the connecting member 206 to which it is journaled. An opposing second side of the rollers 202, 204 are free and unconnected, as in the earlier embodiment, such that the flexible drive element runs can be inserted therebetween without obstruction.

The embodiment of FIG. 5 is preferred in some instances to the embodiment of FIG. 1, in that the two lower rollers 204 exert greater pressure on the flexible drive element than the single upper roller 202, preventing the tensioning device 200 from tipping up out of a vertical orientation during use.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A tensioning device for a drive system having a flexible drive element mounted on at least one driven member, the tensioning device comprising:

a first tensioning member having a first side, a second side, and a first contact surface for contacting the drive element;

a second tensioning member having a first side, a second side, and a second contact surface for contacting the drive element; and an elongated connecting member having a first end and a second end, the connecting member defines at least one longitudinal contour along the length of the connecting member that reinforces the stiffness of the member wherein the first sides of the tensioning members are secured to the respective ends of the connecting member in a spaced relationship, with the first and second contact surfaces of the tensioning members in opposing disposition and spaced apart to permit first and second runs of the drive element to pass between the tensioning members while in contact with the first and second contact surfaces, respectively, the connecting member holding the tensioning members a fixed distance from one another during operation of the drive system, such that during operation, the tensioning device can respond to fluctuations in load on the drive element by moving in a direction parallel to the drive element at the points of contact between the drive element and the tensioning members, and wherein the second sides of the tensioning members remain unconnected for free access to the drive element therebetween.

2. The tensioning device of claim 1, wherein the longitudinal contour is formed by at least one edge located along the length of the connecting member being angled relative to the first side.

3. The tensioning device of claim 1, wherein the first tensioning member is mounted on the connecting member so that it can be selectively positioned at a selected distance from the second tensioning member.

4. The tensioning device of claim 3, wherein the connecting member defines a plurality of apertures for selectively mounting the first tensioning member at a selected one of a plurality of distances from the second tensioning member.

5. The tensioning device of claim 1 wherein the tensioning member comprises a roller.

6. The tensioning device of claim 1, further comprising a third tensioning member disposed adjacent to second tensioning member, having a first side secured to the connecting member for contact of the second run of the drive element and a second side that is unconnected to the second side of the first and second tensioning members.

7. A tensioning device for a drive system having a flexible drive element mounted on at least one driven member, the tensioning device comprising:

a first tensioning member having a first side, a second side, and a first contact surface for contacting the drive element;

a second tensioning member having a first side, a second side, and a second contact surface for contacting the drive element;

an elongated connecting member having a first end and a second end, the connecting member having a first side and a second side, wherein the connecting member is formed to have at least one longitudinal edge angled relative to the first side to reinforce the stiffness of the member, and wherein the first sides of the tensioning members are secured to the respective ends of the connecting member in a spaced relationship, with the first and second contact surfaces of the tensioning members in opposing disposition and spaced apart to permit first and second runs of the drive element to pass between the tensioning members while in contact with the first and second contact surfaces, respectively, the connecting member holding the tensioning members a fixed distance from one another during operation of the drive system, such that during operation, the tensioning device can respond to fluctuations in load on the drive element by moving in a direction parallel to the drive element at the points of contact between the drive element and the tensioning members, and wherein the second sides of the tensioning members remain unconnected for free access to the drive element therebetween.

8. The tensioning device of claim 7, wherein the connecting member has first and second longitudinal edges, each of which is angled relative to the first side.

9. A tensioning device for a drive system having a flexible drive element mounted on at least one driven member, the tensioning device comprising:

a first roller having a first side, a second side, and a first contact surface for contacting the drive element;

a second roller having a first side, a second side, and a second contact surface for contacting the drive element;

an elongated connecting member having a first end and a second end, wherein the first sides of the rollers are rotatably secured to the respective ends of the connecting member in a spaced relationship, with the first and second contact surfaces of the rollers in opposing disposition and spaced apart to permit first and second runs of the drive element to pass between the rollers while in contact with the first and second contact surfaces, respectively, the connecting member holding the rollers a fixed distance from one another during operation of the drive system, such that during operation, the tensioning device can respond to fluctuations in load on the drive element by moving in a direction parallel to the drive element at the points of contact between the drive element and the rollers, and wherein the second sides of the rollers remain unconnected for free access to the drive element therebetween, the connecting member defining at least one longitudinal rib along the length of the connecting member that reinforces the stiffness of the member.

10. A tensioning device for a drive system having a flexible drive element mounted on at least one driven member, the tensioning device comprising:

a first tensioning member having a first side, a second side, and a first contact surface for contacting the drive element;

a second tensioning member having a first side, a second side, and a second contact surface for contacting the drive element;

an elongated connecting member having a first end and a second end, wherein the first sides of the tensioning members are secured to the respective ends of the connecting member in a spaced relationship, with the first and second contact surfaces of the tensioning members in opposing disposition and spaced apart to permit first and second runs of the drive element to pass between the tensioning members while in contact with the first and second contact surfaces, respectively, the connecting member holding the tensioning members a fixed distance from one another during operation of the drive system, such that during operation, the tensioning device can respond to fluctuations in load on the drive element by moving in a direction parallel to the drive element at the points of contact between the drive element and the tensioning members, and wherein the second sides of the tensioning members remain unconnected for free access to the drive element therebetween, at least one end of the connecting member defining a plurality of apertures for selectively mounting the first tensioning member at a plurality of distances from the second tensioning member.

* * * * *

UNITED STATES PATENT AND TRADEMARK OFFICE
CERTIFICATE OF CORRECTION

PATENT NO. : 6,743,131 B1
DATED : June 1, 2004
INVENTOR(S) : H.F. Walker

It is certified that error appears in the above-identified patent and that said Letters Patent is hereby corrected as shown below:

<u>Title page,</u>
Item [56], References Cited, U.S. PATENT DOCUMENTS, insert in appropriate order
-- 5,938,551   8/1999  Warner --

Signed and Sealed this

Eleventh Day of January, 2005

JON W. DUDAS
*Director of the United States Patent and Trademark Office*